(12) United States Patent
Michel et al.

(10) Patent No.: US 9,763,127 B2
(45) Date of Patent: Sep. 12, 2017

(54) USER EQUIPMENT HANDOVER ERROR REPORTING

(71) Applicant: INTEL CORPORATION, Santa Clara, CA (US)

(72) Inventors: Juergen Michel, Munich (DE); Bernhard Raaf, Neuried (DE); Thorsten Clevorn, Munich (DE)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 14/359,874

(22) PCT Filed: Dec. 20, 2013

(86) PCT No.: PCT/US2013/077196
§ 371 (c)(1),
(2) Date: May 21, 2014

(87) PCT Pub. No.: WO2015/094365
PCT Pub. Date: Jun. 25, 2015

(65) Prior Publication Data
US 2015/0237516 A1  Aug. 20, 2015

(51) Int. Cl.
*H04L 12/26* (2006.01)
*H04W 24/10* (2009.01)
*H04W 36/00* (2009.01)

(52) U.S. Cl.
CPC ....... *H04W 24/10* (2013.01); *H04W 36/0094* (2013.01)

(58) Field of Classification Search
None
See application file for complete search history.

(56) References Cited

U.S. PATENT DOCUMENTS

2009/0046573 A1*  2/2009  Damnjanovic ....... H04W 36/30
                                                   370/216
2010/0173626 A1    7/2010  Catovic et al.
(Continued)

FOREIGN PATENT DOCUMENTS

EP           2605585 A1     6/2013
WO    WO 2013/104651 A1    7/2013
WO         2013152708 A1   10/2013

OTHER PUBLICATIONS

International Search Report and Written Opinion mailed Sep. 18, 2014 from International Application No. PCT/US2013/077196.
(Continued)

*Primary Examiner* — Minh-Trang Nguyen
(74) *Attorney, Agent, or Firm* — Schwabe, Williamson & Wyatt, P.C.

(57) ABSTRACT

Embodiments described herein relate generally to a user equipment ("UE") that is to transmit a handover error report to an access node. An access node may use information in the handover error report to adjust configurations for parameters that are used to make handover decisions. A UE may transmit such a handover error report in response to an undesirable handover procedure from a source access node to a target access node, such as a failed or nearly failed or too early handover procedure. The UE may transmit this handover error report to either the source access node or the target access node or another node.

25 Claims, 9 Drawing Sheets

(56) References Cited

U.S. PATENT DOCUMENTS

| | | | |
|---|---|---|---|
| 2010/0234027 A1 | 9/2010 | Han et al. | |
| 2010/0273487 A1 | 10/2010 | Alonso-Rubio et al. | |
| 2011/0080825 A1* | 4/2011 | Dimou | H04J 11/0086 370/216 |
| 2012/0040662 A1 | 2/2012 | Rahman et al. | |
| 2012/0127876 A1* | 5/2012 | Hunukumbure | H04W 24/00 370/252 |
| 2014/0071946 A1* | 3/2014 | Terry | H04L 1/0023 370/331 |

OTHER PUBLICATIONS

Hamalainen et al., "LTE Self-Organising Networks (SON)—Network Management Automation for Operational Efficiency," John Wiley & Sons (2012), Jan. 2012, pp. 136-157, 22 pages.

Anas et al., "Performance Analysis of Handover Measurements and Layer 3 Filtering for UTRAN LTE," The 18th Annual IEEE International Symposium on Person, Indoor and Mobile Radio Communications (PIMRC'07) Oct. 2007, 5 pages.

NMC Consulting Group, "LTE X2 Handover," website: http://www.3glteinfo.com/wp-content/uploads/2013/12/NMC.LTE-X2-Handover.v1.0.pdf, 2002, 2 pages.

3GPP, "General Packet Radio Service (GPRS) enhancements for Evolved Universal Terrestrial Radio Access Network (E-UTRAN) access (Release 11)," 3GPP TS 23.401 V11.5.0 (Mar. 2013), Mar. 7, 2013, Lte Advanced, 286 pages.

3GPP, "Evolved Universal Terrestrial Radio Access (E-UTRA) and Evolved Universal Terrestrial Radio Access Network (E-UTRAN); Overall description; Stage 2 (Release 11)," 3GPP TS 36.300 V11.4.0 (Dec. 2012), Jan. 3, 2013, Lte Advanced, 208 pages.

Fujitsu, "Radio Link Failure Root Cause Analysis," 3GPP TSG-RAN WG3 #75, R3-120100, Agenda Item: 11.1.2, Feb. 6-10, 2012, Dresden, Germany, 4 pages.

Nokia Siemens Networks, "UE assisted information for eDDA," 3GPP TSG-RAN WG2 Meeting #77bis, R2-121201, Agenda Item: 71.2, Mar. 26-30, 2012, Jeju, South Korea, 4 pages.

NSN, "Timer based approach for detection of misconfigured threshold of a dual threshold event," 3GPP TSG RAN WG3 Meeting #81-bis, R3-131764, Agenda Item: 10.3.1, Oct. 7-11, 2013, Venice, Italy, 4 pages.

Extended European Search Report dated Jun. 28, 2017 from European Patent Application No. 13899457.9, 15 pages.

* cited by examiner

… (1) …

USER EQUIPMENT HANDOVER ERROR REPORTING

CROSS REFERENCE TO RELATED APPLICATIONS

The present application is a national phase entry under 35 U.S.C. §371 of International Application No. PCT/US2013/077196, filed Dec. 20, 2013, entitled "UE HANDOVER ERROR REPORTING", which designates the United States of America, the entire disclosure of which is hereby incorporated by reference in its entirety.

FIELD OF INVENTION

The embodiments described herein relate generally to the technical field of data processing, and more particularly, to wireless networks provided by cells to user equipment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

In many self-organizing networks, a user equipment ("UE") may be handed over from one evolved node B ("eNB") to another eNB based on some parameters related to the handover procedure. These settings related to these parameters may be changed by an eNB based on Minimization of Drive Test ("MDT"). While operating on a cell provided by an eNB, a UE may be in Radio Resource Control ("RRC") connected mode or idle mode. A UE may also be termed as a user terminal or simply a terminal or a phone or a communication device. While in RRC connected mode, the UE may be adapted to submit one or more measurement reports, typically measurement information including Reference Signal Received Power and Reference Signal Received Quality, to the eNB periodically or upon detecting specific reporting triggers. While in RRC idle mode, the UE may log measurement information associated with the cell on which it is operating and, when the UE enters RRC connected mode, transmit the log to the eNB.

An eNB may use information from the measurement reports to tune parameters, which are to be transmitted to other UEs operating on the cell provided by the eNB. However, this MDT approach generates appreciable overhead at a UE that is to transmit a measurement report with respect to, for example, processing capacity and power consumption. Additionally, a UE that is to transmit a measurement report lacks a mechanism to indicate to an eNB which parameter contributed to a failed handover. As wireless networks may dynamically change with the addition of eNBs and low-powered base stations (e.g., picocells, femtocells, and the like), this MDT approach may be inefficient in the future.

BRIEF DESCRIPTION OF THE DRAWINGS

The embodiments described herein are illustrated by way of example and not by way of limitation in the figures of the accompanying drawings in which like references indicate similar elements. It should be noted that references to "an" or "one" embodiment described in this disclosure are not necessarily to the same embodiment, and they mean at least one.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

Figure 1:
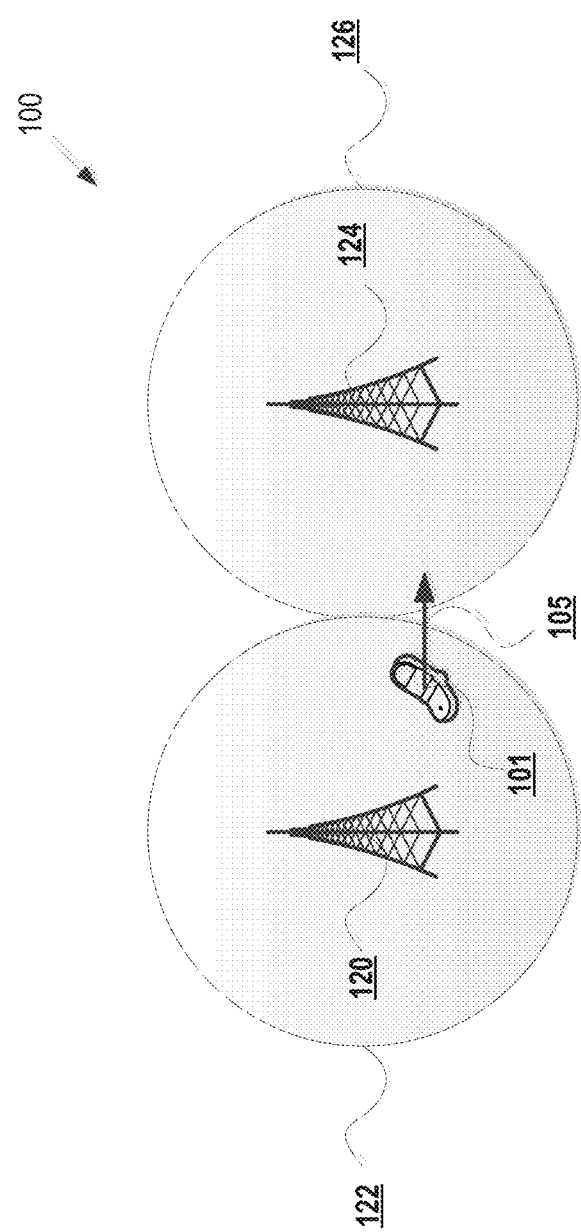
FIG. 1 is an exemplary wireless communication network illustrating a UE that may transmit a handover error report, in accordance with various embodiments.

Beginning first with FIG. 1, a wireless network environment 100 is illustrated, according to one embodiment. The wireless network environment 100 may include a plurality of wireless cells 122, 126 and each of the wireless cells 122, 126 may be provided by a respective access node 120, 124. The wireless cells 122, 126 may be adapted to provide communication services to a UE 101. The wireless network comprised of the cells 122, 126 may be an access network of a 3rd Generation Partnership Project ("3GPP") long-term evolution ("LTE") network such as evolved universal mobile telecommunication system ("UMTS") terrestrial radio access network ("E-UTRAN") or a universal mobile telecommunication system ("UMTS") terrestrial radio access network ("UTRAN"). In various embodiments, the wireless network comprised of cells 122, 126 may be a WiFi or Worldwide Interoperability for Microwave Access ("WiMAX") network. Accordingly, an access node 120, 124 may be, for example, an eNB, a base transceiver station, a base station, an access point, or a node B.

A UE 101 may operate on a wireless cell 122, 126 of a wireless network. As illustrated herein, a UE 101 may operate on a first cell 122 of a wireless network, and may engage in communication services provided by the cell 122 while operating thereon. For example, the UE 101 may be engaged in a conversational call while operating on the cell 122 provided by the access node 120. Similarly, another wireless cell 126 that may be proximate to the first wireless cell 122 may be adapted to provide communication services (e.g., conversational calls) to the UE 101 while operating on the other cell 126.

Each cell 122, 126 of the wireless network serves a finite geographical area, the boundary of which may be reached by the UE 101 while the UE 101 is operating on either cell 122, 126. In the illustrated embodiment, the UE 101 may be engaged in a conversational call while operating on the first cell 122. So that the UE 101 may operate with uninterrupted service across the wireless network comprised of the cells 122, 126, the source access node 120 providing the first cell 122 may perform a handover procedure of the UE 101 to the target access node 124. In traveling along a path 105, the UE 101 approaches the boundary of the cell 122 provided by the source access node 120, the source access node 120 may then handover the UE 101 to the other cell 126 provided by the target access node 124.

To effect the handover procedure, the source access node 120 may transmit measurement configurations for measurement parameters, such as one or more thresholds, hysteresis, and/or a time-to-trigger (e.g., the minimum amount of time a triggering condition related to the cell 126 must be met in order to trigger the UE 101 to send a measurement report to the source access node 120). The UE 101 may apply these received measurement configurations for the measurement parameters and transmit a measurement report to the source access node 120 when the path 105 of the UE 101 causes the UE 101 to approach the boundary of the wireless cell 122 provided by the source access node 120. From the measurement report, the source access node 120 may determine that the UE 101 is to be handed over to the target access node 124 as the UE 101 travels into the geographical area covered by the second wireless cell 126.

In some instances, the handover procedure of the UE 101 from the source access node 120 to the target access node 124 may be undesirable (e.g., the handover may be initiated to early or too late). To increase effectiveness of the handover procedures, the UE 101 may provide to an access node 120, 124 one or more recommended configurations for one or more parameters associated with handover procedures. In various embodiments, the UE 101 may compute one or more recommended configurations for a signal strength threshold for handoff from the first cell 122 to the second cell 126, a signal strength difference, a hysteresis margin, a time-to-trigger duration, an interval for the UE 101 to transmit Radio Resource Management ("RRM") measurements, a Layer 3 filter coefficient, and/or a Layer 1 averaging parameter. In response, the receiving access node 120, 124 may adjust one or more handover parameters based on the received recommended configurations.

In one embodiment, a handover procedure may be undesirable in that the handover procedure nearly failed. As the UE 101 reaches the boundary along the path 105, the UE 101 may determine that a configuration for a parameter was barely fulfilled—e.g., the UE 101 may detect that a signal strength threshold for the second cell 126 was barely surpassed. In such an embodiment, the UE 101 may compute one or more recommended configurations for one or more parameters, such as a lower signal strength threshold for the second cell 126, so that the one or more configurations for the one or more parameters are more likely to be fulfilled. The UE 101 may then transmit the one or more recommended configurations for the one or more parameters to the source access node 120 contemporaneously with a measurement report, such as in a same message or in a separate message that is proximate in time to the measurement report. In response, the source access node 120 may evaluate the one or more recommended configurations for the one or more parameters and adjust one or more configurations of one or more parameters that the source access node 120 is to transmit to UEs which operate on the cell 122 provided the source access node 120.

In one embodiment, a handover procedure may be undesirable in that the handover procedure nearly failed. As the UE 101 reaches the boundary along the path 105, the UE 101 may determine that a configuration for a parameter was barely fulfilled—e.g., the UE 101 may detect that a configured threshold for a signal strength parameter associated with the second cell 126 was barely surpassed. In such an embodiment, the UE 101 may compute one or more recommended configurations for one or more parameters, such as a lower signal strength threshold for the second cell 126, so that the one or more configurations for the one or more parameters are more likely to be fulfilled. The UE 101 may then transmit the one or more recommended configurations for the one or more parameters to the source access node 120 contemporaneously with a measurement report, such as in a same message or in a separate message that is proximate in time to the measurement report. In response, the source access node 120 may evaluate the one or more recommended configurations for the one or more parameters and adjust one or more configurations of one or more parameters that the source access node 120 is to transmit to UEs that operate on the cell 122 provided by the source access node 120.

In another embodiment, a handover procedure may be undesirable in that the handover procedure resulted in a radio link failure. As the UE 101 reaches the boundary along the path 105, the UE 101 may determine that a configuration for a parameter was not fulfilled or was fulfilled too late—e.g., the UE 101 may detect that a configured threshold for a signal strength parameter associated with the second cell 126 was not reached during the handover procedure or was not reached until the UE 101 had traveled along the path 105 outside the range of the first cell 122. In such an embodiment, the UE 101 may compute one or more recommended configurations for one or more parameters, such as a lower signal strength threshold for the second cell 126, so that the one or more configurations for the one or more parameters are more likely to be fulfilled in the future. The UE 101 may then transmit the one or more recommended configurations for the one or more parameters to the target access node 120. The UE 101 may transmit the one or more configurations for the one or more parameters contemporaneously with a message related to a radio link failure recovery procedure, such as after the uplink grant is received from the target access node during radio link reestablishment. In response, the target access node 124 may evaluate the one or more recommended configurations for the one or more parameters and adjust one or more configurations of one or more parameters that the target access node 124 is to transmit to UEs which operate on the cell 126 provided by the target access node 124.

Figure 2:
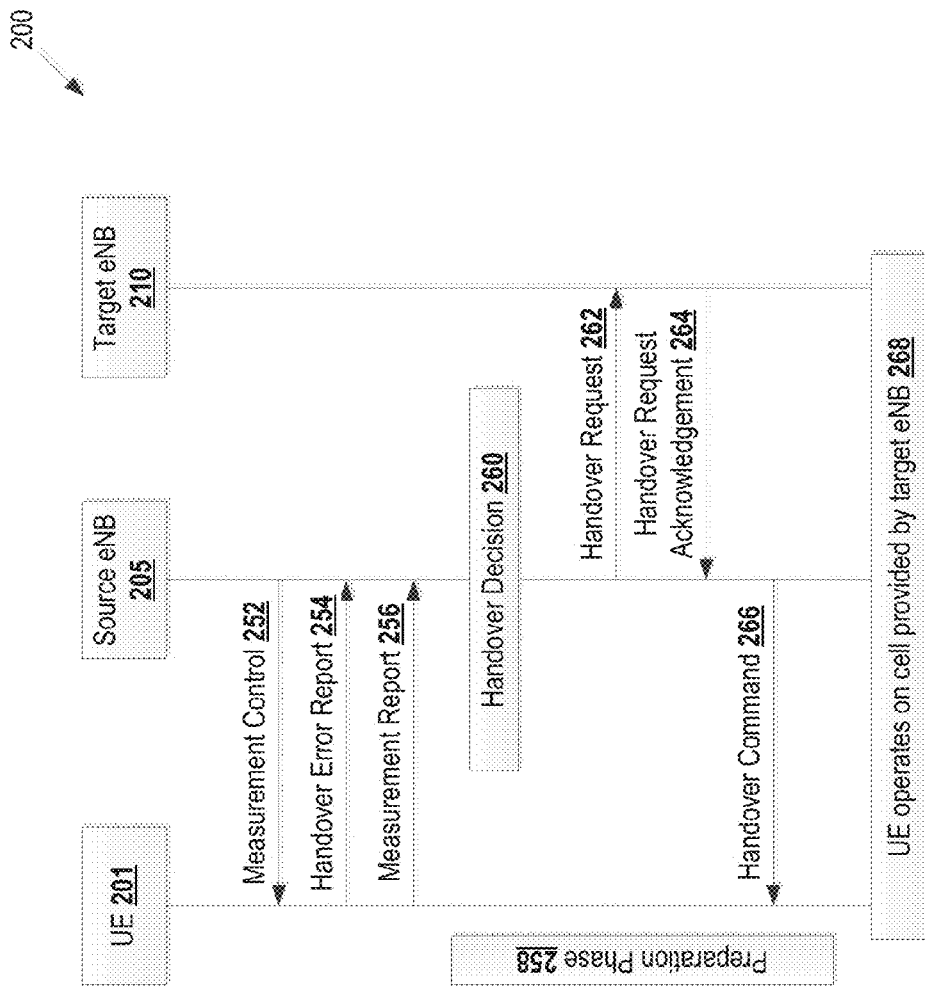
FIG. 2 is a sequence diagram illustrating error reporting by a UE to a source access node, in accordance with various embodiments.

Turning now to FIG. 2, a sequence diagram 200 illustrates an embodiment of error reporting by a UE to an access node to improve future handover procedures (e.g., prevent failed handover procedures and/or achieve more desirable handover procedures). In the context of FIG. 1, the UE 201 may correspond to the UE 101, the source access node 205 can be included in the first access node 120, and the target access node 210 can be included in the second access node 124. Accordingly, the source access node 205 and the target access node 210 may be adapted to provide first and second wireless cells (not shown), respectively, of a wireless network on which the UE 201 may operate.

In the illustrated embodiment, the UE 201 may be operating on the first cell provided by the source access node 205. In so doing, the UE 201 may be approaching a boundary of the cell provided by the source access node 205. The source access node 205 may transmit at least one measurement control message to the UE 201 as the UE 201 is operating on the wireless cell provided by the source access node 205 (operation 252). The at least one measurement control message may include a plurality of configurations for a plurality of parameters that the UE 201 is to implement. For example, the at least one measurement control message may include a signal strength threshold for starting reporting of the target access node 210 to the source access node 205 (consequently leading to a threshold before initiating a handoff from a first cell provided by the source access node 205 to a second cell provided by the target access node 210), a signal strength difference, a hysteresis margin, a time-to-trigger duration, an interval for the UE 201 to transmit RRM measurements, a Layer 3 filter coefficient, and/or a Layer 1 averaging parameter.

According to the implemented configurations for the parameters, the UE 201 may determine a point at which to transmit at least one measurement report message to the source access node 205. For example, a configuration for a reference signal received power ("RSRP") parameter may be implemented as sixty-eight (68) decibel-milliwatt ("dBm") and, accordingly, the UE 201 may transmit the at least one measurement report message when the UE 201 determines that the measured RSRP reaches sixty-eight (68) dBm. Contemporaneously (e.g., either simultaneously or proximate in time) with the determination by the UE 201 to transmit the at least one measurement report message, the UE may detect that a handover procedure that is to be performed between the access nodes 205, 210 is undesirable, e.g., undesirably late, in that the handover procedure is near failure (e.g., results in a radio link failure). In various embodiments, the UE 201 may detect this undesirable handover procedure by, for example, detecting that a signal-to-noise ratio associated with signals received from the source access node 205 exceeds a predetermined threshold, e.g., gets worse than a predetermined threshold, in advance of the handover procedure.

In connection with detecting a handover procedure providing undesirable results, e.g., handover nearly failed, the UE 201 may compute at least one recommended configuration for at least one parameter. The UE 201 may compute the at least one recommended configuration for the at least one parameter based on a predetermined algorithm that is adapted to increase the likelihood of a handover procedure providing desirable results in the future. According to the embodiment, the at least one recommended configuration may be computed for a signal strength threshold for handoff from a first cell to the second cell, a signal strength difference, a hysteresis margin, a time-to-trigger duration, an interval for the UE 201 to transmit RRM measurements, a Layer 3 filter coefficient, and/or a Layer 1 averaging parameter.

Subsequently, the UE 201 may transmit at least one handover error report message to the source access node 205 that includes at least one recommended configuration for at least one parameter (operation 254). In various embodiments, the at least one handover error report message may be extended to include positioning information, such as global navigation satellite system ("GNSS") information and/or radio frequency fingerprinting information. Contemporaneously with the transmission of the handover error report message, the UE 201 may transmit at least one measurement report message that is consistent with the at least one measurement control message received from the source access node 205—e.g., the UE 201 transmits the at least one measurement report message after a time-to-trigger duration that is defined in the at least one measurement control message (operation 256).

As illustrated in the embodiment, the at least one handover error report message may be transmitted to the source access node 205 before at least one measurement report message. In another embodiment, the at least one measurement report message that is transmitted by the UE 201 to the source access node 205 may be extended to include the at least one handover error report message. In even another embodiment, the at least one handover error report message may be transmitted to the source access node 205 after the at least one measurement report message—for example, the UE 201 may delay transmission of the at least one handover error report message to the source access node 205 until after the handover procedure, until the UE 201 detects that a signal strength received from the source access node 205 has reaches a predetermined level, or the like.

Based on the at least one handover error report message, the source access node 205 may evaluate the configurations currently set for parameters that are transmitted to one or more UEs that operate on a wireless cell provided by the source access node 205. Accordingly, the source access node 205 may determine that one or more set configurations for one or more parameters are to be adjusted in response to the at least one handover error report message. The source access node 205 may adjust at least one set configuration for at least one parameter based on both the one or more recommended configurations and a predetermined algorithm that is adapted to increase the likelihood of a handover procedure providing desirable results in the future.

Based on the at least one measurement report message, preparation of a handover procedure may begin (operation 258). The source access node 205 may evaluate the at least one measurement report message received from the UE 201 and determine whether the UE 201 is to be handed over to the target access node 210 (operation 260). Where the source access node 205 determines that the UE 201 is to be handed over to the target access node 210, the source access node 205 may transmit to the target access node 210 a handover request message that includes information necessary for the target access node 210 to prepare to have the UE 201 handed over to it (operation 262). In response, the target access node 210 transmits to the source access node 205 a handover acknowledgement message, which may include, for example, information to be transmitted to the UE 201 for the handover procedure (operation 264). The source access node 205 may then transmit to the UE 201 a handover command message, which is to instruct the UE 201 to perform handover to the target access node 210 (operation 266). Thereafter, the UE 201 may operate on a wireless cell provided by the target access node 210 (operation 268).

Figure 3:
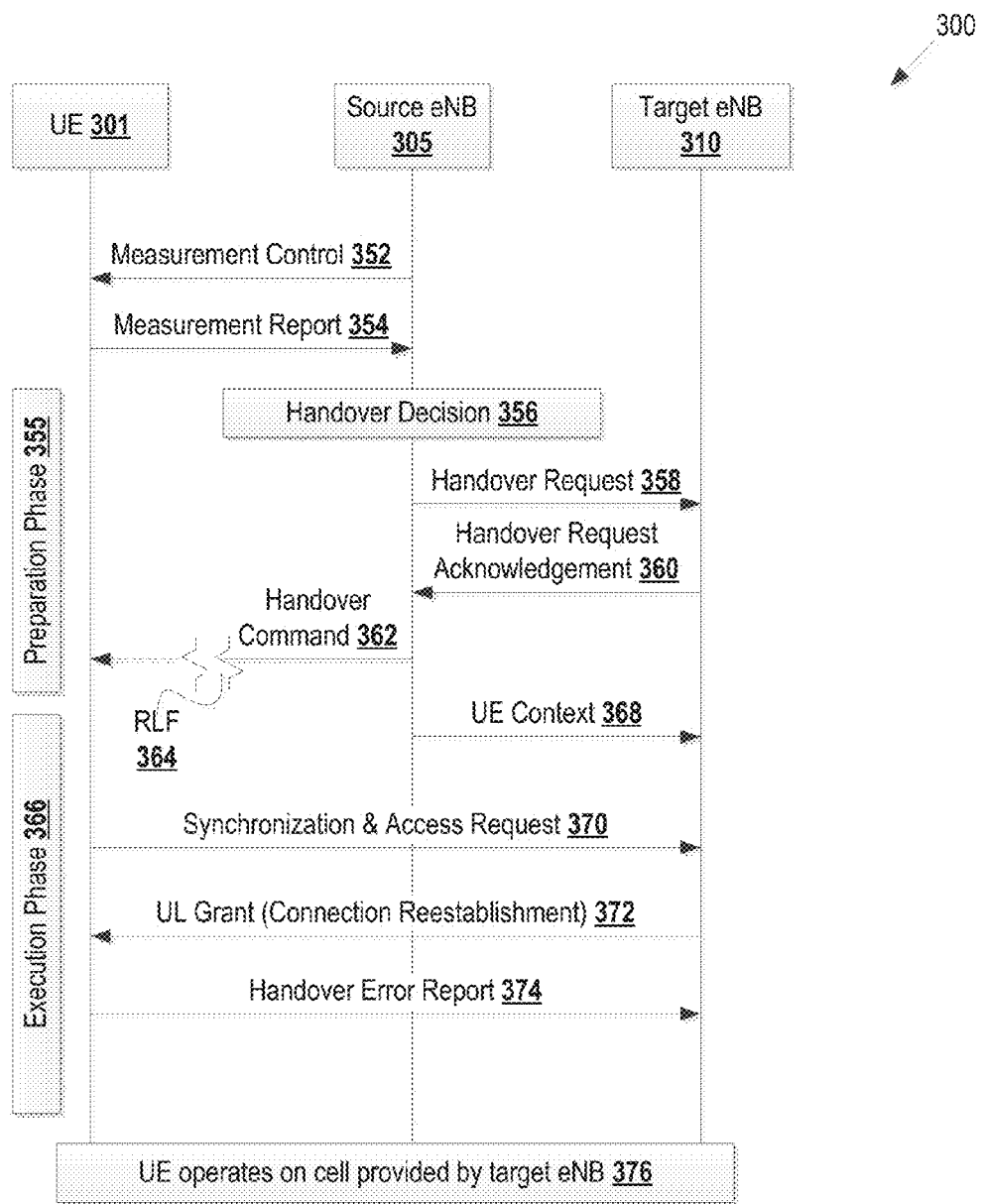
FIG. 3 is a sequence diagram illustrating error reporting by a UE to a target access node, in accordance with various embodiments.

Now with reference to FIG. 3, a sequence diagram 300 illustrates an embodiment of error reporting by a UE to an access node to improve future handover procedures (e.g., prevent failed handover procedures and/or achieve more desirable handover procedures). In the context of FIG. 1, the UE 301 can be included in the UE 101, the source access node 305 can be included in the first access node 120, and the target access node 310 can be included in the second access node 124. Accordingly, the source access node 305 and the target access node 310 may be adapted to provide first and second wireless cells (not shown), respectively, of a wireless network on which the UE 301 may operate.

In the illustrated embodiment, the UE 301 may be operating on the first cell provided by the source access node 305. In so doing, the UE 301 may be approaching a boundary of the cell provided by the source access node 305. The source access node 305 may transmit at least one measurement control message to the UE 301 as the UE 301 is operating on the wireless cell provided by the source access node 305 (operation 352). The at least one measurement control message may include a plurality of configurations for a plurality of parameters that the UE 301 is to implement. For example, the at least one measurement control message may include a signal strength threshold for handoff from a first cell provided by the source access node 305 to a second cell provided by the target access node 310, a signal strength difference, a hysteresis margin, a time-to-trigger duration, an interval for the UE 301 to transmit RRM measurements, a Layer 3 filter coefficient, and/or a Layer 1 averaging parameter.

According to the implemented configurations for the parameters, the UE 301 may determine a point at which to transmit at least one measurement report message to the source access node 305. For example, a configuration for a reference signal received power ("RSRP") parameter may be implemented as sixty-eight (68) dBm and, accordingly, the UE 301 may transmit the at least one measurement report message when the UE 301 determines that the measured RSRP reaches sixty-eight (68) dBm. In another embodiment, a parameter that defines when the UE 301 is to transmit the at least one measurement report message to the source access node 305 may be configured as triggered by an event or after a time interval. Where the UE 301 determines that one or more implemented configurations for one or more parameters have be fulfilled, the UE 301 may transmit at least one measurement report message to the source access node 305—e.g., the UE 301 may transmit the at least one measurement report message after a time-to-trigger duration that is defined in the at least one measurement control message (operation 354).

Based on the at least one measurement report message, preparation of a handover procedure may begin (operation 355). The source access node 305 may evaluate the at least one measurement report message received from the UE 301 and determine whether the UE 301 is to be handed over to the target access node 310 (operation 356). Where the source access node 305 determines that the UE 301 is to be handed over to the target access node 310, the source access node 305 may transmit to the target access node 310 a handover request message that includes information necessary for the target access node 310 to prepare to have the UE 301 handed over to it (operation 358). In response, the target access node 310 may transmit to the source access node 305 a handover acknowledgement message, which may include, for example, information to be transmitted to the UE 301 for the handover procedure (operation 360).

Following receipt of the handover request acknowledge by the source access node 305, the source access node 305 may attempt to transmit to the UE 301 a handover command message, which is to instruct the UE 301 to perform handover to the target access node 310 (operation 362). In the illustrated embodiment, however, a radio link failure ("RLF") occurs while the source access node 305 attempts to transmit the handover command message to the UE 301—e.g., a signal strength is too weak for the UE 301 to receive the handover command message, the signal-to-noise ratio of the handover command message is insufficient for the UE 301 to decode the handover command message (operation 364). In various embodiments, the UE 301 may detect an RLF where, for example, the RSRP and/or the reference signal received quality ("RSRQ") is too low, the UE 301 is unable to decode the Physical Downlink Control Channel ("PDCCH") and/or the Physical Downlink Shared Channel ("PDSCH"), or other signaling issue.

Although the handover procedure may experience an RLF, the handover procedure still may reach the execution phase so that the UE 301 may operate on a wireless cell provided by the target access node 310 (operation 366). Accordingly, the source access node 305 may continue performing operations consistent with the execution of a handover procedure, and in so doing may transmit at least one UE context message that includes information associated with the UE 301, such as network subscription information, capabilities and/or functionality of the UE 301, and the like (operation 368). Thus, the handover procedure of the UE 301 to the target access node 310 may be executed with very limited data loss, or even no data loss.

According to one embodiment, the UE 301 may start a countdown timer where a radio link failure is estimated to have occurred (e.g., where the UE 301 is unable to decode at least one signal that is to be received from the source access node 305). Upon expiry of the countdown timer, the UE 301 may detect a radio link failure. Based on the detected radio link failure, the UE 301 may attempt to reestablish a radio link connection. However, the UE 301 may be insufficiently proximate to the source access node 305 to operate on a wireless cell provided by the source access node 305. Instead, the UE 301 may be sufficiently proximate to the target access node 310 to operate on a wireless cell provided by the target access node 310. Where the UE 301 is sufficiently proximate to the target access node 310, the UE 301 may perform synchronization based on one or more synchronization signals received from the target access node 310 (e.g., a primary synchronization signal, a secondary synchronization signal, and/or a common reference signal) and transmit at least one access request message to the target access node 310 (operation 370). So that the UE 301 is able to reestablish a radio link connection with the wireless network, the target access node 310 may transmit to the UE 301 at least one message associated with uplink transmission (operation 372). The at least one message associated with uplink transmission may include, for example, information allocating one or more uplink channels to the UE 301 as well as defining a timing advance. Accordingly, the UE 301 may operate on a wireless cell provided by the target access node 310 (operation 376).

Based on the detected RLF from which the UE 301 is to recover, the UE 301 may detect that the handover procedure from the source access node 305 to the target access node 310 was undesirable because the handover procedure resulted in an RLF. Accordingly, the UE 301 may compute at least one recommended configuration for at least one parameter so that an RLF may be avoided in the future. The UE 301 may compute the at least one recommended configuration for the at least one parameter based on a predetermined algorithm that is adapted to reduce the likelihood of undesirable handover procedures in the future. According to the embodiment, the at least one recommended configuration may be computed for a signal strength threshold for handoff from a first cell to the second cell, a signal strength difference, a hysteresis margin, a time-to-trigger duration, an interval for the UE 301 to transmit RRM measurements, a Layer 3 filter coefficient, and/or a Layer 1 averaging parameter. As described herein, changing a parameter in order to avoid failed (or nearly failed) handovers for one UE may worsen handover performance for other UEs. By providing multiple parameters, all of which are intended to enhance handover performance for one UE, a more desirable decision can be made amongst the provided parameters by selecting the parameter that causes least undesirable effects on other UEs.

Contemporaneously with the radio link connection reestablishment, the UE 301 may transmit at least one handover error report message to the target access node 310 that includes at least one recommended configuration for at least one parameter (operation 374). In various embodiments, the at least one handover error report message may be extended to include positioning information, such as global navigation satellite system ("GNSS") information and/or radio frequency fingerprinting information. In the illustrated embodiment, the at least one handover error report message may be transmitted to the target access node 310 immediately after the uplink allocation is granted by the target access node 310. In other embodiments, another message (not shown) may be extended to include the at least one handover error report message, a Radio Resource Configuration ("RRC") Connection Reconfiguration message transmitted from the UE 301 to the target access node 310 may be extended to include the at least one handover error report message.

Based on the at least one handover error report message, the target access node 310 may evaluate the configurations currently set for parameters that are transmitted to one or more UEs that operate on a wireless cell provided by the target access node 310. Accordingly, the target access node 310 may determine that one or more set configurations for one or more parameters are to be adjusted in response to the at least one handover error report message. The access node 310 may adjust at least one set configuration for at least one parameter based on both the one or more recommended configurations and a predetermined algorithm that is adapted to reduce the likelihood of undesirable handover procedures in the future. In another embodiment, the target access node 310 may transmit the at least one handover error report message to the source access node 305 so that the source access node 305 may adapt one or more configurations for one or more parameters to avoid RLFs.

Figure 4:
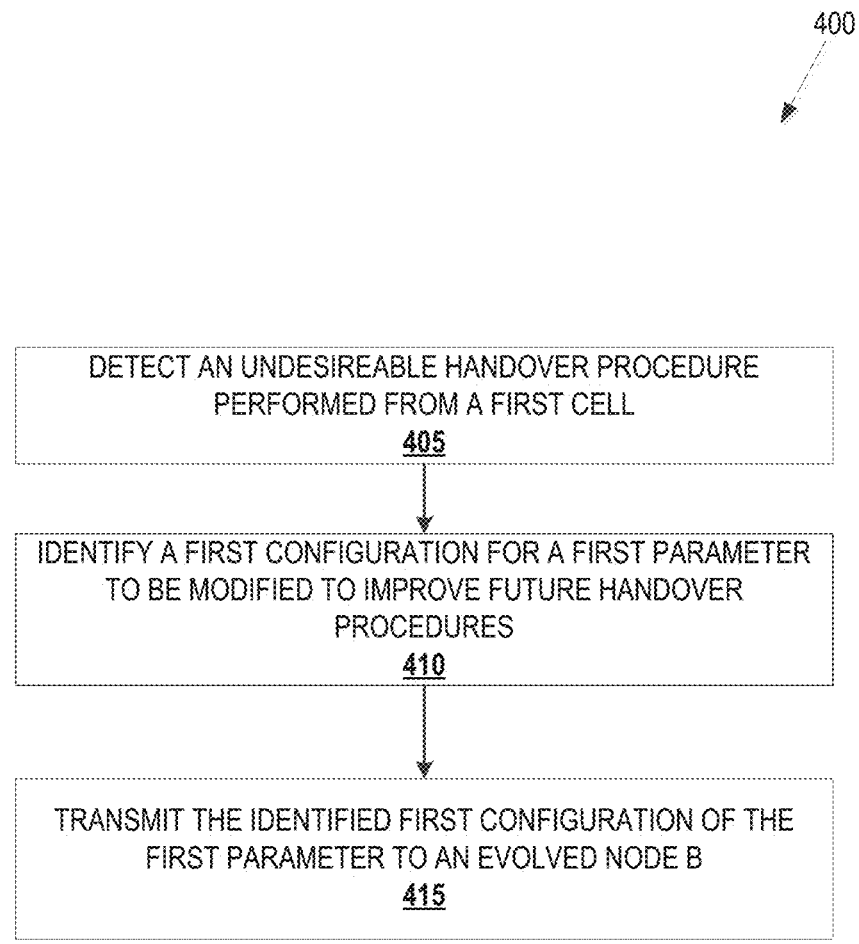
FIG. 4 is a flow diagram illustrating a method for transmitting a handover error report by a UE to a target access node, in accordance with various embodiments.

Turning to FIG. 4, a flow diagram depicts a method 400 for error reporting by a UE to improve handover procedures, in accordance with some embodiments. The method 400 may be performed by circuitry that is to be implemented in a UE that operates on a first cell provided by a first access node, such as the UE 101 that operates on the first cell 122 provided by the first access node 120 shown in FIG. 1. The UE may follow a path away from the first cell and toward a second cell provided by a second access node—e.g., the second cell 126 provided by the second access node 124—such that the UE may be handed over from the first access node to the second access node. While FIG. 4 illustrates a plurality of sequential operations, one of ordinary skill would understand that one or more operations of the method 400 may be transposed and/or performed contemporaneously.

At operation 405, the method 400 begins by detecting an undesirable handover procedure performed from a first cell on which the UE is to operate to a second cell on which the UE is to operate. An undesirable handover procedure may be a handover procedure that fails, nearly fails, occurrs too early (colloquially referred to as a ping-pong handover), or otherwise may be improved. According to embodiments, the undesirable handover procedure may be detected based on one or more measurements associated with one or more parameters, such as a measurement for a parameter that is within or outside of a certain margin around expected values. For example, an RLF may occur that is indicative of a failed handover procedure. In various embodiments, operation 405 comprises operations for estimating when a problem with the radio link has occurred and beginning a countdown timer where a radio link problem is estimated to have occurred. A signal-to-noise ratio that reaches a certain level may indicate that a radio link problem is estimated to have occurred and therefore cause the countdown timer to begin. At the expiry of the timer, the UE may detect that an RLF has occurred. In one embodiment, at least one access request may be transmitted to the second access node that provides the second cell on which the UE may operate, and the second access node may grant access to the UE (e.g., where a context is available at the second access node for the UE). Other undesirable handovers may be determined from other parameters. For example, a "ping pong" handover can be detected when a UE hands over from a first access node to an second access node but soon afterwards has to hand over to a third access node or back to the first one, in particular if the signal quality towards the first access node or the third access node is sufficiently good during the time the UE was connected to the second access node. This situation indicates that the handover to the second access node was not necessary but instead the UE could have directly handed over to the third access node or could have stayed with the first access node.

Based on the undesirable handover procedure, the method 400 may include an operation 410 for identifying a first configuration for a first parameter that may be modified to improve future handover procedures. In various embodiments, the first configuration for the first parameter may be associated with the first access node and/or the second access node. According to the embodiment, the first parameter may be a signal strength threshold for handoff from the first cell, a signal strength difference, a hysteresis margin, a time-to-trigger duration, an interval for the communications circuitry to transmit RRM measurements, a Layer 3 filter coefficient, or a Layer 1 averaging parameter (e.g., an interval over which to average one of reference signal received power and reference signal received quality). According to various embodiments, a plurality of configurations for a plurality of parameters may be identified—e.g., where the plurality of configurations for the plurality of parameters may have contributed to the failed handover procedure.

In one embodiment, the first configuration of the first parameter is predetermined in advance of the detected undesirable handover procedure—that is, the current configuration that is set for the first parameter at the UE is identified (e.g., the current configuration for the first parameter may be received from the first access node when the UE beings operating on the first cell provided by the first access node). In another embodiment, operation 410 comprises computing a recommended configuration for the first parameter. This recommended configuration may be computed to improve handover procedures in the future. Thus, according to the embodiment, either the current configuration for a parameter that contributed to the undesirable handover procedure or a recommended configuration for a parameter that contributed to the undesirable handover procedure may be identified.

In various embodiments, the first configuration of the first parameter may be added to an aggregate list of identified configurations for identified parameters. This aggregate list may include identified configurations for identified parameters associated with access nodes separate from the first and second access nodes, such as an access node associated with an earlier undesirable handover procedure. By adding configurations for parameters to an aggregate list (instead of, for example, immediately transmitting a configuration for a parameter) load on a network may be reduced, particularly during handover procedures.

In connection with identifying a first configuration for a first parameter, the method 400 may proceed to the operation 415 for transmitting the identified first configuration for the first parameter to an access node. Because of the failed handover procedure, the identified first configuration for the first parameter may be unavailable for transmission to the first access node (e.g., due to an RLF with the UE), and therefore the identified first configuration for the first parameter may be transmitted to the second access node (e.g., after the UE has performed radio link connection reestablishment and is operating on the second cell provided by the second access node). Subsequently, the second access node may adjust a configuration for a parameter at the second access node according to the received first configuration for the first parameter identified at the UE. In another embodiment, the second access node may transmit the first configuration for the first parameter to the first access node so that the first access node may avoid failed handover procedures in the future by adjusting a configuration for a parameter.

According to various embodiments, the identified first configuration for the first parameter may be transmitted to another node in the network (e.g., an access node that is separate from both the first and second access nodes) that is dedicated to receiving identified configurations for parameters. This dedicated node may include an aggregate list of configurations for parameters received from a plurality of UEs and/or access nodes to reduce load on a network and to enable decisions based on comprehensive knowledge.

Figure 5A:
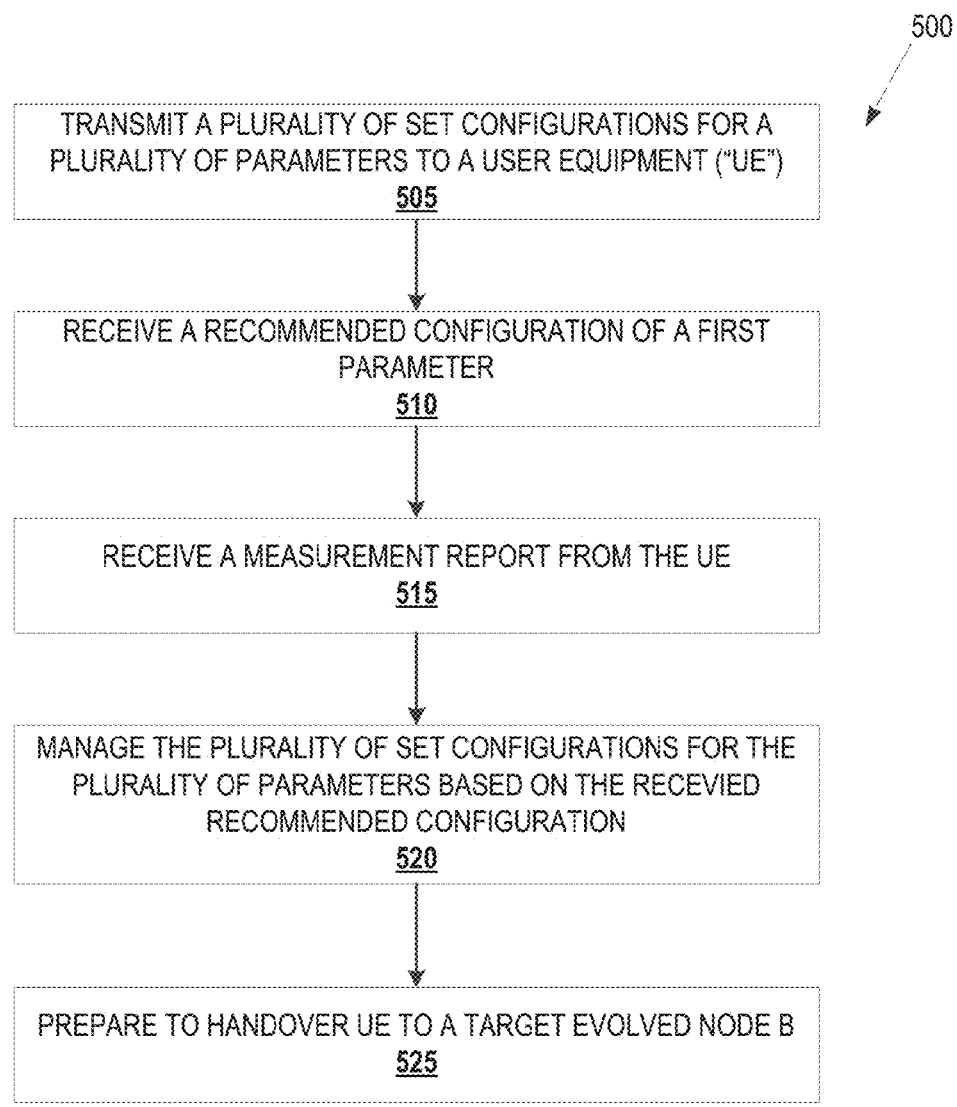
FIG. 5A is a flow diagram illustrating a method for receiving a handover error report from a UE at a source access node, in accordance with various embodiments.

With respect to FIG. 5A, a flow diagram is shown illustrating a method 500 for receiving, by an access node, an error report from a UE based on a nearly failed handover procedure, in accordance with some embodiments. The method 500 may be performed by circuitry that is to be implemented in an access node that provides a cell to a UE, such as the first access node 120 shown in FIG. 1. The method 500 may be performed in an access node handing off a UE, and may be performed where the handover procedure nearly fails. While FIG. 5A illustrates a plurality of sequential operations, one of ordinary skill would understand that one or more operations of the method 500 may be transposed and/or performed contemporaneously.

The method 500 may begin with a first operation 505 of transmitting a plurality of set configurations for a plurality of parameters to a UE. The plurality of set configurations for the plurality of parameters may define when and what type of information a UE is to transmit to the access node so that the access node may perform a handover procedure of the UE (e.g., where the UE is approaching a boundary of a cell provided by the access node).

Subsequently, the method 500 includes an operation 510 for receiving a handover error report that includes at least one recommended configuration for at least one parameter. The handover error report may identify a parameter that is one of a signal strength threshold for handoff from a first cell to the second cell, a signal strength difference, a hysteresis margin, a time-to-trigger duration, an interval for the UE 201 to transmit RRM measurements, a Layer 3 filter coefficient, and a Layer 1 averaging parameter. According to the embodiment, the handover error report may include a recommended configuration for a parameter so that future handovers succeed without nearly failing or, alternatively, the handover error report may simply include the current configuration of a parameter to indicate a configuration of a parameter that caused a handover procedure to nearly fail.

In various embodiments, the handover error report may further include further information associated with a nearly failed handover procedure. For example, the handover error report may be adapted so that positioning information associated with the UE may be received at the access node, such as global navigation satellite system ("GNSS") information and/or radio frequency fingerprinting information. In another embodiment, the handover error report may include an indication of how "close" the handover procedure came to failing. Thus, the access node may receive an indication of a margin that exists between a value measured for a parameter and a predetermined threshold value for that parameter. For example, the handover error report may contain a difference between the signal-to-noise ratio at which the UE is no longer able to decode signals from the access node and the actual signal-to-noise ratio that was evident when the UE decoded signals from the access node.

The method 500 further includes an operation 515 for receiving a measurement report message. In various embodiments, the measurement report message may be received contemporaneously with the reception of the handover error report, and the measurement report message may even include the handover error report. This measurement report message may be consistent with the plurality of set configurations for the plurality of parameters transmitted to the UE—e.g., the UE transmits a measurement report message after a time-to-trigger duration that is defined by a configuration of a time-to-trigger perimeter. Information included in the measurement report message may be used by the UE or access node to determine if the UE is to be handed over from the access node to another access node.

Subsequent to receiving the handover error report, the method 500 may include an operation 520 for managing the plurality of set configurations for the plurality of parameters. This management operation 520 is based on the received recommended configuration for the first a parameter. In various embodiments, the plurality of set configurations for the plurality of parameters also may be managed based on additional information received in the handover error report, such as positioning information and/or an indication of how close the handover procedure came to failing.

In one embodiment, the plurality of set configurations for the plurality of parameters are to be managed by making no changes—e.g., the plurality of set configurations for the plurality of parameters may be determined to be satisfactory for most cases, and the received recommended configuration may increase the likelihood that future handover procedures may fail or nearly fail. In another embodiment, one or more of the set configurations may be adjusted so the future handover procedures are less likely to fail.

Subsequent to receiving the measurement report from the UE, the method 500 may include an operation 525 for preparing to handover the UE to a target access node. This operation 525 may include transmitting a handover request and a UE context to the target access node. Accordingly, the UE may be handed over to the target access node so that the UE may operate on a cell provided by the target access node. In some embodiments, the method 500 may return to an operation similar to operation 505 so that the managed plurality of set configurations for the plurality of parameters may be transmitted to one or more UEs that are operating on the wireless cell.

Figure 5B:
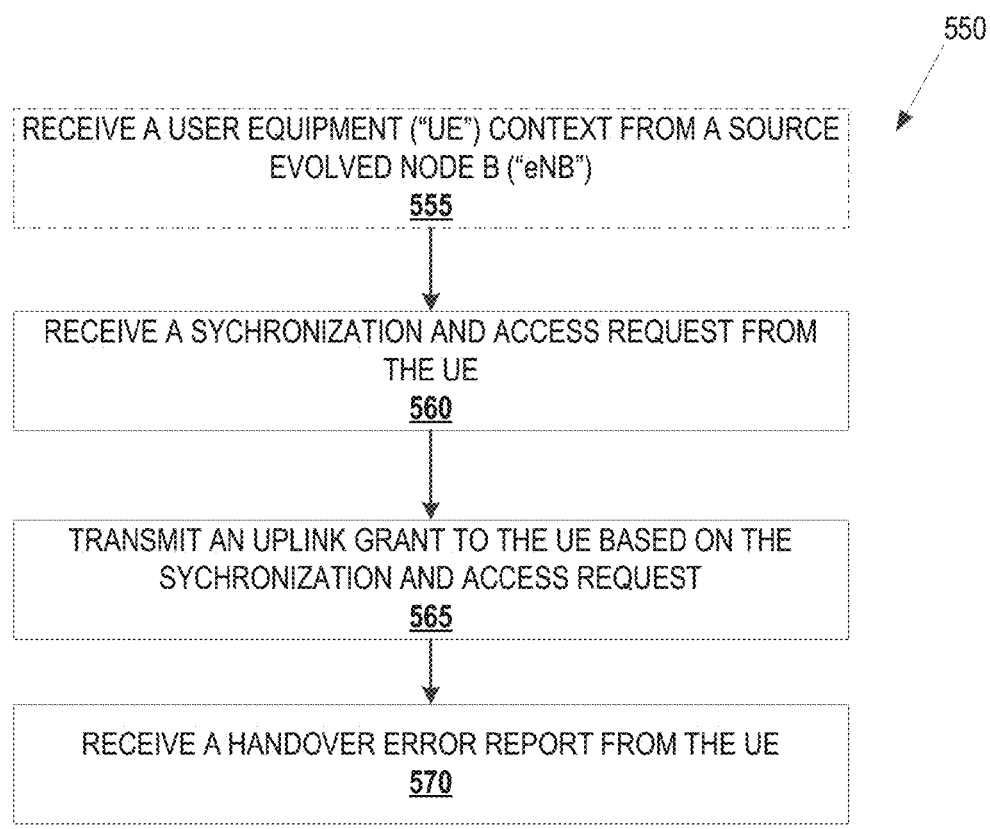
FIG. 5B is a flow diagram illustrating a method for receiving a handover error report from a UE at a target access node, in accordance with various embodiments.

With respect to FIG. 5B, a flow diagram is shown illustrating a method 550 for receiving, by an access node, an error report from a UE based on a failed handover procedure, in accordance with some embodiments. The method 550 may be performed by circuitry that is to be implemented in an access node that provides a cell to a UE, such as the second access node 124 shown in FIG. 1. The method 550 may be performed in an access node to which a UE is handed off, and may be performed where the handover procedure fails, such as where the UE experiences a RLF. While FIG. 5B illustrates a plurality of sequential operations, one of ordinary skill would understand that one or more operations of the method 500 may be transposed and/or performed contemporaneously.

First with reference to operation 555, the method 550 may include an operation for receiving a UE context from a source access node. The UE context may be received in connection with a handover procedure in which a UE is to be handed over to the access node from the source access node. In some instances, however, the handover procedure may fail and the UE may not receive a correct handover command to complete handover of the UE to the access node. In such instances, the UE may attempt to reestablish a radio link connection so that it may operate on a cell. In the illustrated embodiment, the handover procedure may fail and, therefore, the UE may attempt to reestablish radio link communication. Accordingly, the method 550 may include an operation 560 for receiving one or more synchronization and access requests from the UE so that the UE may operate on a cell provided by the access node. Correspondingly, the operation 565 includes transmitting an uplink grant to the UE based on the one or more synchronization and access requests. Following operation 565, the radio link communication may be reestablished at the UE.

Because the handover procedure failed, the UE may provide information to improve handover procedures in the future (e.g., prevent failed handover procedures and/or achieve more desirable handover procedures). However, since the UE experienced the handover failure with the source access node, the UE may not be able to transmit information to the source access node (which may be response for the failed handover procedure), but the UE may still provide such information. Therefore, operation 570 comprises receiving a handover error report from the UE. According to the received handover error report, a plurality of set configurations for a plurality of parameters may be managed. This management may include making no changes to the existing set configurations to the plurality of parameters. In another embodiment, one or more of the set configurations may be adjusted so the future handover procedures are less likely to fail. The managed configurations for the plurality of parameters may be transmitted to one or more UEs that are to operate on the cell provided by the access node and/or may be transmitted to the source access node.

Figure 6A:
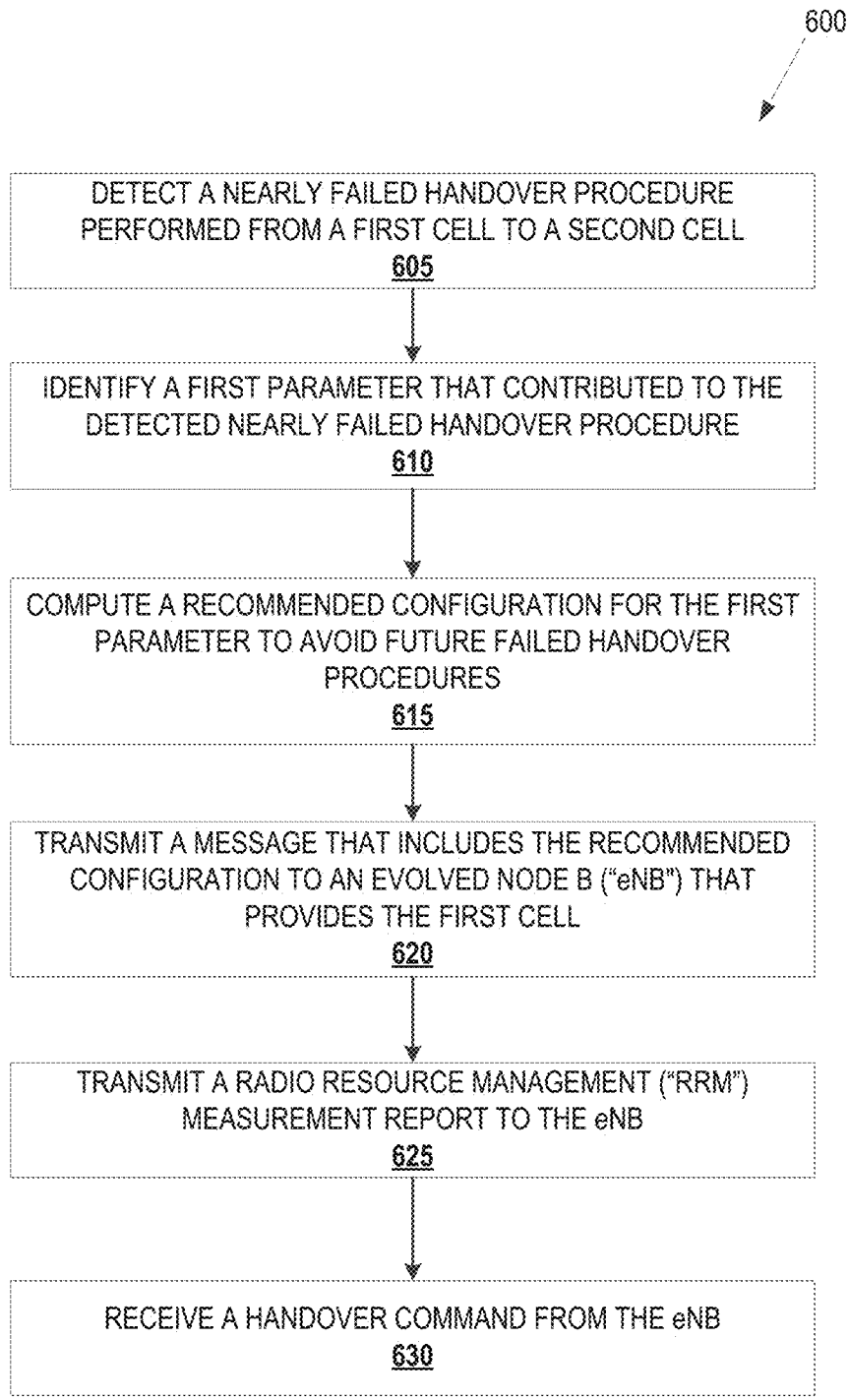
FIG. 6A is a flow diagram illustrating a method for transmitting a handover error report by a UE to a source access node, in accordance with various embodiments.

Turning now to FIG. 6A, a flow diagram depicts a method 600 for transmitting a handover error report based on a nearly failed handover procedure, in accordance with some embodiments. The method 600 may be performed by circuitry that is to be implemented in a UE that operates on a first cell provided by a first access node, such as the UE 101 that operates on the first cell 122 provided by the first access node 120 shown in FIG. 1. The UE may follow a path away from the first cell and toward a second cell provided by a second access node—e.g., the second cell 126 provided by the second access node 124—such that the UE may be handed over from the first access node to the second access node. While FIG. 6A illustrates a plurality of sequential operations, one of ordinary skill would understand that one or more operations of the method 600 may be transposed and/or performed contemporaneously.

At operation 605, the method 600 begins by detecting a nearly failed handover procedure performed from a first cell on which the UE is to operate to a second cell on which the UE is to operate. In various embodiments, operation 605 comprises detecting that a signal-to-noise ratio associated with signals received from a first access node exceeds a predetermined threshold in advance of the handover procedure, thus indicating that the signal is nearly too degraded to be decoded. For example, a handover command received by the UE may have a signal that is substantially degraded by noise such that the handover procedure would likely fail at distances appreciably further from the source access node.

Based on the detection of a nearly failed handover procedure, the method 600 may include an operation 610 for identifying a first parameter that contributed to the nearly failed handover procedure. According to the embodiment, the first parameter may be a signal strength threshold for handoff from the first cell, a hysteresis margin, a time-to-trigger duration, an interval for the communications circuitry to transmit RRM measurements, a Layer 3 filter coefficient, or a Layer 1 averaging parameter (e.g., an interval over which to average one of reference signal received power and reference signal received quality). According to various embodiments, a plurality of parameters may be identified—e.g., where the plurality of parameters may have contributed to the failed handover procedure.

From the identified first parameter, an operation 615 may be reached for computing a recommended configuration for the first parameter. This recommended configuration may be computed to avoid failed handover procedures in the future. In various embodiments, a predetermined algorithm that is based at least in part on a current configuration for the first parameter may be used to compute the recommended configuration. In further embodiments, a plurality of recommended configurations may be computed for a plurality of parameters.

In connection with computing the recommended configuration for the first parameter, the method 600 may proceed to the operation 620 for transmitting the recommended configuration for the first parameter to the first access node that provides the first cell on which the UE may operate. This first access node may be, for example, the source access node that is to hand over the UE to a target access node as the UE approaches a boundary of the cell provided by the source access node. Subsequently, the first access node may adjust a configuration for a parameter at the first access node according to the recommended configuration for the first parameter provided by the UE.

In various embodiments, operation 620 may include transmitting additional information associated with a nearly failed handover procedure. For example, positioning information associated with the UE may be transmitted to the first access node, such as global navigation satellite system ("GNSS") information and/or radio frequency fingerprinting information. In another embodiment, the operation 620 may include transmitting an indication of how "close" the handover procedure came to failing. Thus, an indication of a margin that exists between a value measured for a parameter and a predetermined threshold value for that parameter may be transmitted to the first access node—e.g., a difference between the signal-to-noise ratio at which the UE is no longer able to decode signals from the access node and the actual signal-to-noise ratio that was measured when the UE decoded signals from the access node.

So that the first access node may make a handover decision that is suitable for the UE, operation 625 comprises transmitting an RRM measurement report to the first access node. The RRM measurement report may be transmitted to the first access node based on configurations for parameters provided to the UE by the first access node as the UE operated on the cell provided by the first access node. In various embodiments, the RRM measurement report may be extended to include the recommended configuration for the first parameter. Alternatively, the recommended configuration for the first parameter may be transmitted in a message that is separate from RRM measurement report. Where the first access node determines that a handover procedure is to occur, the method 600 includes an operation 630 for receiving a handover command from the first access node. Therefore, the UE may be handed over to a second cell provided by a second access node so that the UE may operate on a wireless network with uninterrupted service.

Figure 6B:
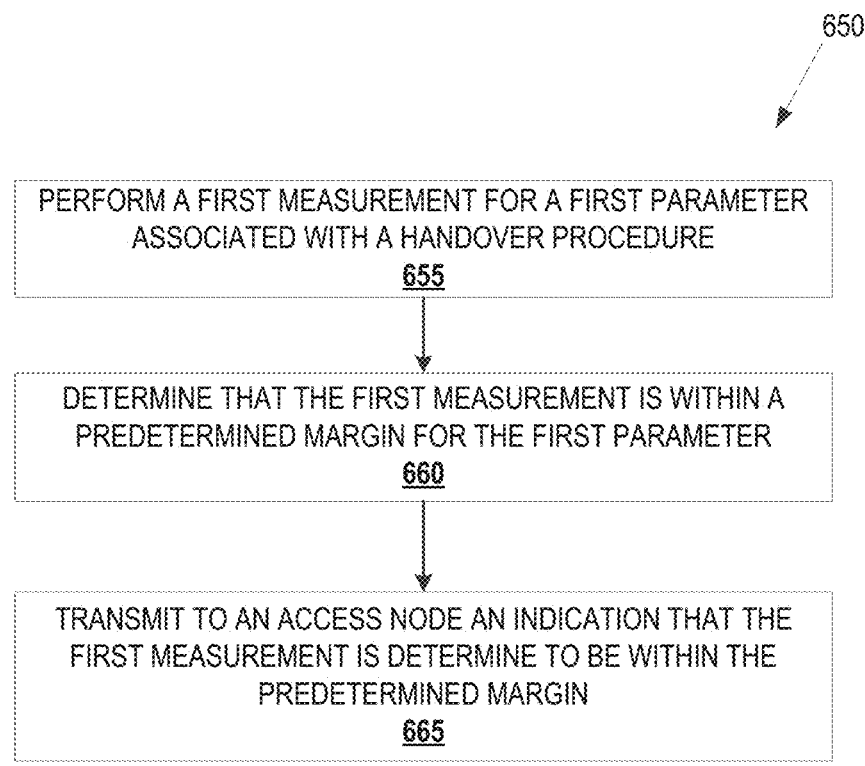
FIG. 6B is a flow diagram illustrating a method for transmitting a handover error report based on a nearly failed handover procedure, in accordance with some embodiments.

Turning now to FIG. 6B, a flow diagram depicts a method 650 for transmitting a handover error report based on a nearly failed handover procedure, in accordance with some embodiments. The method 650 may be performed by circuitry that is to be implemented in a UE that operates on a first cell provided by a first access node, such as the UE 101 that operates on the first cell 122 provided by the first eNB access node 120 shown in FIG. 1. The UE may follow a path away from the first cell and toward a second cell provided by a second access node—e.g., the second cell 126 provided by the second access node 124—such that the UE may be handed over from the first access node to the second access node. While FIG. 6B illustrates a plurality of sequential operations, one of ordinary skill would understand that one or more operations of the method 650 may be transposed and/or performed contemporaneously.

To begin, the method 650 may include an operation 655 for performing a first measurement for a first parameter associated with a handover procedure. In various embodiments, the first measurement for the first parameter may be an RRM measurement that is to be transmitted to an access node for a handover decision. For example, the first measurement may be a measurement related to RSRP or RSRQ. According to some embodiments, a plurality of measurements are performed for a plurality of parameters.

Based on the first measurement, the method 650 may reach an operation 660 for determining that the first measurement is within a predetermined margin for the first parameter. In a first embodiment, the predetermined margin may be a range of values below a threshold amount (i.e., a negative margin) that indicates the handover procedure may fail, however if the first measurement were to reach the threshold amount then the handover procedure may succeed. In another embodiment, the predetermined margin may be a range of values above a threshold amount (i.e., a positive margin) that indicates the handover procedure may succeed, however if the first measurement were to descend to the threshold amount then the handover procedure may fail.

In connection with the determination performed at operation 660, operation 665 comprises transmitting, to an access node, an indication that the first measurement is determined to be within the predetermined margin. As described, this indication may indicate how far a handover procedure is from failure or success. For example, the indication may include an estimate of how far the first measurement for the first parameter is from a threshold value at which the handover procedure would have failed. Advantageously, this indication can be leveraged by an access node (e.g., a source or target access node) to evaluate recommended configurations for the first parameter transmitted by one or more UEs (e.g., whether adjusting the first parameter may be beneficial or detrimental for handovers associated with other UEs). Such information may ease the selection of proper handover parameters: without this information (e.g., only information about failed handovers is available), an access node may be adapted to change a parameter in consideration of one or more UEs that reported a failure due to the current parameter setting. However, this change of parameter may result in undesirable handover procedures for other UEs (e.g., the handover procedures associated with these other UEs would not have failed but for the change of parameter). Information available to the access node in advance of one or more handover procedures may prevent the access node from modifying one or more configurations for one or more parameters that may result in an increased number of undesirable handover procedures. For example, handovers that succeed but only with a limited margin may be undesirable, as they limit the freedom to tune associated parameters. As such handover procedures that are undesirable in this sense may additionally be reported on, even if conventionally they would not be described as undesirable.

Figure 7:
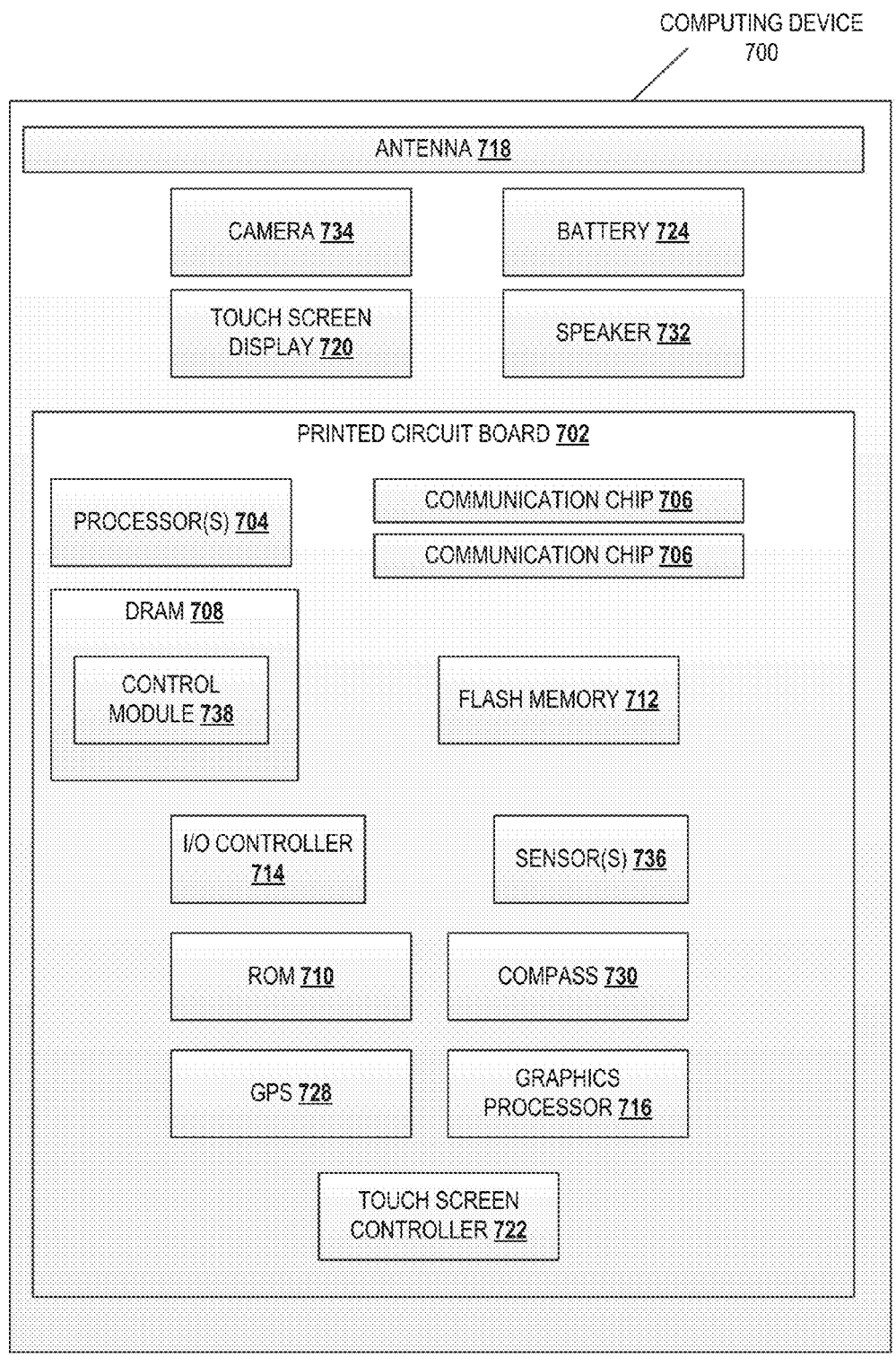
FIG. 7 is a block diagram of a computing device adapted to operate in a wireless communication network, in accordance to various embodiments.

With respect to FIG. 7, a block diagram illustrates an example computing device 700, in accordance with various embodiments. The UE 101, first access node 120, and/or second access node 124 of FIG. 1 and described herein may be implemented on a computing device such as computing device 700. The computing device 700 may include a number of components, one or more processor(s) 704 and at least one communication chip(s) 706. Depending upon the embodiment, one or more of the enumerated components may comprise "circuitry" of the computing device 700, such as processing circuitry, communications circuitry, and the like. In various embodiments, the one or more processor(s) 704 each may be a processor core. In various embodiments, the at least one communication chips 706 may be physically and electrically coupled with the one or more processors 704. In further implementations, the communication chips 706 may be part of the one or more processors 704. In various embodiments, the computing device 700 may include a printed circuit board ("PCB") 702. For these embodiments, the one or more processors 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global positioning system ("GPS") or other satellite navigation device 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the processor 704 may be integrated on the same die with other components to form a system on a chip ("SOC").

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processors 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processors 704, enable the computing device 700 to operate one or more modules 738 configured to practice all or selected aspects of the data exchanges and method described herein, depending on the embodiment of the computing device 700 used to implement such data exchanges and methods.

The communication chips 706 may enable wired and/or wireless communications for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as Wi-Fi and Bluetooth, whereas a second communication chip 706 may be dedicated to longer range wireless communications, such as GPS, EDGE, GPRS, CDMA, WiMAX, LTE, LTE-A, Ev-DO, and the like.

In various implementations, the computing device 700 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 700 may be another other electronic device that processes data.

In various embodiments, example 1 may be an apparatus to be included in a user equipment ("UE"), the apparatus comprising: processing circuitry to detect an undesirable handover procedure performed from a first cell on which the UE is to operate and to identify a first configuration for a first parameter that contributed to the detected undesirable handover procedure; and communications circuitry, communicatively coupled with the processing circuitry, to transmit the identified first configuration of the first parameter to an access node. Example 2 may include the apparatus of example 1, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter. Example 3 may include the apparatus of example 1, wherein the detected undesirable handover procedure is a failed handover procedure, a nearly failed handover procedure, or a handover procedure that occurred too early. Example 4 may include the apparatus of any of examples 1-3, wherein the processing circuitry is to: detect the undesirable handover procedure based on a radio link failure with the first cell; start a countdown timer when the radio link failure is estimated to have occurred; and detect the radio link failure based on expiry of the countdown timer. Example 5 may include the apparatus of any of examples 1-3, wherein the first configuration of the first parameter is predetermined in advance of the detected undesirable handover procedure. Example 6 may include the apparatus of any of examples 1-3, wherein the first configuration of the first parameter is computed by the processing circuitry based on the detected undesirable handover procedure to improve future handover procedures. Example 7 may include the apparatus of any of examples 1-3, wherein the processing circuitry is to identify a plurality of configurations, including the first configuration, of a plurality of parameters, including the first parameter, that contributed to the detected undesirable handover procedure; and the communications circuitry to transmit, to the access node, the plurality of configurations of the plurality of parameters.

In various embodiments, example 8 may be an apparatus to be included in an access node, the apparatus comprising: communications circuitry to transmit, to a user equipment ("UE") served by a first cell provided by the access node, a plurality of set configurations for a plurality of parameters that are to be used by the UE to perform at least one measurement associated with handover of the UE from the first cell, and to receive a recommended configuration of a first parameter included in the plurality of parameters, the received recommended configuration of the first parameter to be associated with an undesirable handover procedure from the first cell; and processing circuitry, communicatively coupled with the communications circuitry, to manage the plurality of set configurations for the plurality of parameters based on the received recommended configuration of the first parameter to prevent future undesirable handover procedures. Example 9 may include the apparatus of example 8, wherein the undesirable handover procedure is a failed handover procedure or a completed handover procedure that nearly failed. Example 10 may include the apparatus of any of examples 8-9, wherein the plurality of parameters includes a signal strength threshold for handoff from the first cell, a signal strength difference, a hysteresis margin, a time-to-trigger duration, an interval for the at least one UE to transmit Radio Resource Management ("RRM") measurements, a Layer 3 filter coefficient, or a Layer 1 averaging parameter. Example 11 may include the apparatus of any of examples 8-9, wherein processing circuitry is to manage the plurality of set configurations for the plurality of parameters based on the received recommended configuration of the first parameter by refraining from adjusting each configuration of the plurality of set configurations. Example 12 may include the apparatus of any of examples 8-9, wherein the processing circuitry is to manage the plurality of set configurations for the plurality of parameters based on the received recommended configuration of the first parameter by adjusting a set configuration for the first parameter of the plurality of parameters based on the received recommended configuration for the first parameter. Example 13 may include the apparatus of example 12, wherein the communications circuitry is to transmit the plurality of set configurations for the plurality of parameters to the UE based on the adjusting of the set configuration for the first parameter. Example 14 may include the apparatus of any of examples 8-9, wherein the communications circuitry is to receive a plurality of recommended configurations for the plurality of parameters; and the processing circuitry is to manage the first plurality of configurations for the plurality of parameters based on the received plurality of recommended configurations. Example 15 may include the apparatus of any of examples 8-9, wherein the processing circuitry is further to determine, based on the at least one measurement performed at the UE, whether the UE is to be handed over from the first cell to a second cell provided by a target access node; and the communications circuitry is to receive the at least one measurement from the UE, and to transmit a handover request to the target access node where the processing circuitry determines that the UE is to be handed over from the first cell to a second cell.

In various embodiments, example 16 may be an apparatus to be included in a user equipment ("UE"), the apparatus comprising: processing circuitry to detect a near failure of a handover procedure performed from a first cell on which the UE is to operate to a second cell, to identify a first parameter associated with a source access node providing the first cell that contributed to the near failure of the handover procedure, and to compute a recommended configuration for the first parameter to avoid future failed handover procedures; and communications circuitry, communicatively coupled with the processing circuitry, to transmit to the source access node the recommended configuration of the first parameter associated with the source access node. Example 17 includes the apparatus of example 16, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter. Example 18 may include the apparatus of any of examples 16-17, wherein the communications circuitry is further to transmit to the source access node positioning information associated with the UE. Example 19 may include the apparatus of any of examples 16-17, wherein the processing circuitry is to detect the near failure of the handover procedure based on a signal-to-noise ratio of a message, and further wherein, the communications circuitry is further to receive the message from the source access node, and to transmit an indication of the near failure of the handover procedure to the access node. Example 20 may include the apparatus of any of examples 16-17, wherein the communications circuitry is to transmit the recommended configuration of the first parameter to the source access node after the handover procedure is complete such that the UE is operating on the second cell. Example 21 may include the apparatus of any of examples 16-17, wherein the communications circuitry is to transmit the recommended configuration of the first parameter in a measurement reporting message that additionally includes at least one RRM measurement associated with the handover procedure, and further wherein, the processing circuitry is further to perform the at least one RRM measurement associated with the handover procedure and to generate the measurement reporting message that includes the recommended configuration and the RRM measurement.

In various embodiments, example 22 may be an apparatus to be included in a user equipment ("UE"), the apparatus comprising: processing circuitry to perform a first measurement for a first parameter associated with a handover procedure performed from a first cell on which the UE is to operate to a second cell, and to determine that the first measurement for the first parameter associated with the handover procedure is within a predetermined margin for the first parameter; and communications circuitry, communicatively coupled with the processing circuitry, to transmit to an access node an indication that the first measurement is determined to be within the predetermined margin. Example 23 may include the apparatus of example 22, wherein the indication that the first measurement is determined to be within the predetermined margin comprises an estimate of how far the first measurement for the first parameter is from a threshold value at which the handover procedure would have failed. Example 24 may include the apparatus of any of examples 22-23, wherein the predetermined margin for the first parameter is either negative to indicate that the handover procedure failed or positive to indicate that the handover procedure did not fail. Example 25 may include the apparatus of any of examples 22-23, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter.

In various embodiments, example 26 may be a computer-implemented method to be performed by a user equipment ("UE"), the method comprising: detecting an undesirable handover procedure performed from a first cell on which the UE is to operate; identifying a first configuration for a first parameter that contributed to the detected undesirable handover procedure; and transmitting the identified first configuration of the first parameter to an access node. Example 27 may include the computer-implemented method of example 26, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter. Example 28 may include the computer-implemented method of example 27, wherein the detected undesirable handover procedure is a failed handover procedure, a nearly failed handover procedure, or a handover procedure that occurred too early. Example 29 may include the computer-implemented method of any of examples 26-28, wherein the undesirable handover procedure is detected based on a radio link failure with the first cell, and the method further comprising: starting a countdown timer when the radio link failure is estimated to have occurred; and detecting the radio link failure based on expiry of the countdown timer. Example 30 may include the computer-implemented method of any of examples 26-28, wherein the first configuration of the first parameter is predetermined in advance of the detected undesirable handover procedure. Example 31 may include the computer-implemented method of any of examples 26-28, wherein the first configuration of the first parameter is computed by the processing circuitry based on the detected undesirable handover procedure to improve future handover procedures.

In various embodiments, example 32 may be one or more non-transitory computing device-readable media comprising computing device-executable instructions to be included in an access node, wherein the instructions, in response to execution by a computing device, cause the computing device to: transmit, to a user equipment ("UE") served by a first cell provided by the access node, a plurality of set configurations for a plurality of parameters that are to be used by the UE to perform at least one measurement associated with handover of the UE from the first cell; receive a recommended configuration of a first parameter included in the plurality of parameters, the received recommended configuration of the first parameter to be associated with an undesirable handover procedure from the first cell; and manage the plurality of set configurations for the plurality of parameters based on the received recommended configuration of the first parameter to prevent future undesirable handover procedures. Example 33 may include the one or more non-transitory computing device-readable media of example 32, wherein the undesirable handover procedure is a failed handover procedure or a completed handover procedure that nearly failed. Example 34 may include the one or more non-transitory computing device-readable media of any of examples 32-33, wherein the plurality of parameters includes a signal strength threshold for handoff from the first cell, a signal strength difference, a hysteresis margin, a time-to-trigger duration, an interval for the at least one UE to transmit Radio Resource Management ("RRM") measurements, a Layer 3 filter coefficient, or a Layer 1 averaging parameter. Example 35 may include the one or more non-transitory computing device-readable media of any of examples 32-33, wherein processing circuitry is to manage the plurality of set configurations for the plurality of parameters based on the received recommended configuration of the first parameter by refraining from adjusting each configuration of the plurality of set configurations.

In various embodiments, example 36 may be a system to be included in a UE, the system comprising: at least one processor; and at least one memory having processor-executable instructions that, in response to execution by the at least one processor, cause the system to: detect a near failure of a handover procedure performed from a first cell on which the UE is to operate to a second cell; identify a first parameter associated with a source access node providing the first cell that contributed to the near failure of the handover procedure; compute a recommended configuration for the first parameter to avoid future failed handover procedures; and transmit to the source access node the recommended configuration of the first parameter associated with the source access node. Example 37 may include the system of example 36, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter. Example 38 may include the system of any of claims 36-37, wherein the near failure of the handover procedure is to be detected based on a signal-to-noise ratio of a message, and further wherein, the instructions are further to cause to the system to: receive the message from the source access node; and transmit an indication of the near failure of the handover procedure to the access node.

In various embodiments, example 39 may be a computer-implemented method to be performed in a user equipment ("UE"), the method comprising: performing a first measurement for a first parameter associated with a handover procedure performed from a first cell on which the UE is to operate to a second cell; determining that the first measurement for the first parameter associated with the handover procedure is within a predetermined margin for the first parameter; and transmitting, to an access node, an indication that the first measurement is determined to be within the predetermined margin. Example 40 may include the computer-implemented method of claim 39, wherein the indication that the first measurement is determined to be within the predetermined margin comprises an estimate of how far the first measurement for the first parameter is from a threshold value at which the handover procedure would have failed.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments shown herein are not described with reference to any particular programming language. It will be appreciated that a variety of programming languages can be used to implement the teachings of embodiments as described herein.

In the foregoing Specification, embodiments have been described with reference to specific exemplary embodiments thereof. It will be evident that various modifications can be made thereto without departing from the broader spirit and scope as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
    processing circuitry to detect an undesirable handover procedure performed from a first cell on which the UE is to operate and to identify a first configuration for a first parameter that contributed to the detected undesirable handover procedure; and
    communications circuitry, communicatively coupled with the processing circuitry, to transmit the identified first configuration of the first parameter to an access node.

2. The apparatus of claim 1, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter.

3. The apparatus of claim 1, wherein the detected undesirable handover procedure is a failed handover procedure, a nearly failed handover procedure, or a handover procedure that occurred too early.

4. The apparatus of claim 1, wherein the processing circuitry is to:
    detect the undesirable handover procedure based on a radio link failure with the first cell;
    start a countdown timer when the radio link failure is estimated to have occurred; and
    detect the radio link failure based on expiry of the countdown timer.

5. The apparatus of claim 1, wherein the first configuration of the first parameter is predetermined in advance of the detected undesirable handover procedure.

6. The apparatus of claim 1, wherein the first configuration of the first parameter is computed by the processing circuitry based on the detected undesirable handover procedure to improve future handover procedures.

7. The apparatus of claim 1, wherein
    the processing circuitry is to identify a plurality of configurations, including the first configuration, of a plurality of parameters, including the first parameter, that contributed to the detected undesirable handover procedure; and
    the communications circuitry to transmit, to the access node, the plurality of configurations of the plurality of parameters.

8. An apparatus to be included in an access node, the apparatus comprising:
    communications circuitry to transmit, to a user equipment ("UE") served by a first cell provided by the access node, a plurality of set configurations for a plurality of parameters that are to be used by the UE to perform at least one measurement associated with handover of the UE from the first cell, and to receive a recommended configuration of a first parameter included in the plurality of parameters, the received recommended configuration of the first parameter to be associated with an undesirable handover procedure from the first cell; and
    processing circuitry, communicatively coupled with the communications circuitry, to manage the plurality of set configurations for the plurality of parameters based on the received recommended configuration of the first parameter to prevent future undesirable handover procedures.

9. The apparatus of claim 8, wherein the undesirable handover procedure is a failed handover procedure or a completed handover procedure that nearly failed.

10. The apparatus of claim 8, wherein the plurality of parameters includes a signal strength threshold for handoff from the first cell, a signal strength difference, a hysteresis margin, a time-to-trigger duration, an interval for the UE to transmit Radio Resource Management ("RRM") measurements, a Layer 3 filter coefficient, or a Layer 1 averaging parameter.

11. The apparatus of claim 8, wherein the processing circuitry is to manage the plurality of set configurations for the plurality of parameters based on the received recommended configuration of the first parameter by refraining from adjusting each configuration of the plurality of set configurations.

12. The apparatus of claim 8, wherein the processing circuitry is to manage the plurality of set configurations for the plurality of parameters based on the received recommended configuration of the first parameter by adjusting a set configuration for the first parameter of the plurality of parameters based on the received recommended configuration for the first parameter.

13. The apparatus of claim 12, wherein the communications circuitry is to transmit the plurality of set configurations for the plurality of parameters to the UE based on the adjusting of the set configuration for the first parameter.

14. The apparatus of claim 8, wherein
the communications circuitry is to receive a plurality of recommended configurations for the plurality of parameters; and
the processing circuitry is to manage the plurality of set configurations for the plurality of parameters based on the received plurality of recommended configurations.

15. The apparatus of claim 8, wherein
the processing circuitry is further to determine, based on the at least one measurement performed at the UE, whether the UE is to be handed over from the first cell to a second cell provided by a target access node; and
the communications circuitry is to receive the at least one measurement from the UE, and to transmit a handover request to the target access node where the processing circuitry determines that the UE is to be handed over from the first cell to the second cell.

16. An apparatus to be included in a user equipment ("UE"), the apparatus comprising:
processing circuitry to detect a near failure of a handover procedure performed from a first cell on which the UE is to operate to a second cell, to identify a first parameter associated with a source access node providing the first cell that contributed to the near failure of the handover procedure, and to compute a recommended configuration for the first parameter to avoid future failed handover procedures; and
communications circuitry, communicatively coupled with the processing circuitry, to transmit to the source access node the recommended configuration of the first parameter associated with the source access node.

17. The apparatus of claim 16, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter.

18. The apparatus of claim 16, wherein
the communications circuitry is further to transmit to the source access node positioning information associated with the UE.

19. The apparatus of claim 16, wherein the processing circuitry is to detect the near failure of the handover procedure based on a signal-to-noise ratio of a message, and further wherein,
the communications circuitry is further to receive the message from the source access node, and to transmit an indication of the near failure of the handover procedure to the source access node.

20. The apparatus of claim 16, wherein the communications circuitry is to transmit the recommended configuration of the first parameter to the source access node after the handover procedure is complete such that the UE is operating on the second cell.

21. The apparatus of claim 16, wherein the communications circuitry is to transmit the recommended configuration of the first parameter in a measurement reporting message that additionally includes at least one RRM measurement associated with the handover procedure, and further wherein,
the processing circuitry is further to perform the at least one RRM measurement associated with the handover procedure and to generate the measurement reporting message that includes the recommended configuration and the RRM measurement.

22. An apparatus to be included in a user equipment ("UE"), the apparatus comprising:
processing circuitry to perform a first measurement for a first parameter associated with a handover procedure performed from a first cell on which the UE is to operate to a second cell, and to determine that the first measurement for the first parameter associated with the handover procedure is within a predetermined margin for the first parameter; and
communications circuitry, communicatively coupled with the processing circuitry, to transmit to an access node an indication of how far a handover procedure is from failure or success.

23. The apparatus of claim 22, wherein the indication of how far the handover procedure is from failure or success comprises an estimate of how far the first measurement for the first parameter is from a threshold value at which the handover procedure would have failed.

24. The apparatus of claim 22, wherein the predetermined margin for the first parameter is either negative to indicate that the handover procedure failed or positive to indicate that the handover procedure did not fail.

25. The apparatus of claim 22, wherein the first parameter is a signal strength threshold for handoff from the first cell, a signal strength difference, a hysteresis margin, a time-to-trigger duration, an interval for the communications circuitry to transmit Radio Resource Management ("RRM") measurements, a Layer 3 filter coefficient, or a Layer 1 averaging parameter.

* * * * *